(12) United States Patent
Kondoh (10) Patent No.: US 6,404,976 B1
(45) Date of Patent: Jun. 11, 2002

(54) VISS SIGNAL DETECTION CIRCUIT

(75) Inventor: Shunichi Kondoh, Hyogo (JP)

(73) Assignees: Mitsubishi Denki Kabushiki Kaisha; Mitsubishi Electric Engineering Company Limited, both of Tokyo (JP)

( * ) Notice: Subject to any disclaimer, the term of this patent is extended or adjusted under 35 U.S.C. 154(b) by 0 days.

(21) Appl. No.: 09/204,165

(22) Filed: Dec. 3, 1998

(30) Foreign Application Priority Data

Mar. 30, 1998 (JP) .......................... 10-084526
Aug. 7, 1998 (JP) .......................... 10-224144

(51) Int. Cl.$^7$ .................... H04N 5/91; H04N 7/00; G11B 15/12
(52) U.S. Cl. ........................... 386/46; 360/61
(58) Field of Search .................... 386/14, 16, 46, 386/69, 78–81; 360/61

(56) References Cited

U.S. PATENT DOCUMENTS

| 4,594,618 A | * | 6/1986 | Kozuki et al. ............ 360/73.05 |
| 4,680,648 A | * | 7/1987 | Takayama ................... 386/79 |
| 4,691,256 A | * | 9/1987 | Kozuki et al. ............ 360/73.12 |
| 4,870,510 A | * | 9/1989 | Edakubo et al. .............. 360/27 |
| 5,272,542 A | * | 12/1993 | Lee .............................. 386/14 |
| 5,383,067 A | | 1/1995 | Choi |
| 5,519,549 A | | 5/1996 | Choi |
| 5,539,340 A | | 7/1996 | Van Leeuwen et al. |

FOREIGN PATENT DOCUMENTS

| EP | 0 338 517 | 10/1989 |
| EP | 0 455 910 | 11/1991 |
| GB | 2 120 030 | 11/1983 |
| JP | 10-172198 | 6/1998 |

* cited by examiner

Primary Examiner—Andrew B. Christensen
Assistant Examiner—Polin Chieu
(74) Attorney, Agent, or Firm—McDermott, Will & Emery (57) ABSTRACT

Comparators receiving reference voltages are provided. An output signal from a differential amplifier is applied to these comparators. Here, the relationship of Vref1>Vref2>Vref3>Vref4>Vref5>Vbias>Vref6>Vref7>Vref8>Vref9>Vref10 is established. The output signals from the comparators are applied to a data latch/threshold level select circuit. The select circuit retains the maximum peak level of the prior comparison by the comparators, and retains the minimum peak value of the prior comparison by the comparators. The select circuit selects the output signal of the comparator of one lower level than the comparator that detects the maximum peak level at the prior comparison to supply the selected signal to a RS flip-flop circuit, and selects the output signal of the comparator of one higher level than the comparator that detects the minimum peak level at the prior comparison to supply the selected signal to the RS flip-flop circuit. The RS flip-flop circuit outputs a detection signal of a VISS signal in response to these select signals. As a result, a VISS signal detection circuit can reliably detect only the VISS signal without detecting the erase noise.

5 Claims, 9 Drawing Sheets

VISS SIGNAL DETECTION CIRCUIT

BACKGROUND OF THE INVENTION

1. Field of the Invention

The present invention relates to VISS (VHS Index Search System) signal detection circuits, and more particularly, to a VISS signal detection circuit detecting a VISS signal recorded on a magnetic tape in a VTR (Video Tape Recorder).

2. Description of the Background Art

In a VHS type VTR, there is provided a feature for a user to write desired data on a magnetic tape to facilitate retrieval of data in a recorded tape. More specifically, a VISS signal having two types of duties corresponding to 0 and 1 is recorded on a magnetic tape taking advantage of the control track used in servo control. This VISS signal indicates the index code to be used mainly for head position detection.

A signal recorded on a magnetic tape is read out by a control head. The level of the read out signal varies according to the moving speed of the magnetic tape. When the speed of the magnetic tape is low as at the time of initiating reproduction, the amplitude of the signal read out by the control head is small. In contrast, when the speed of the magnetic tape is high as in fast-forwarding, rewinding, fast-forward reproduction, and rewind reproduction, the amplitude of the read out signal is great. Therefore, the amplitude of the VISS signal read out by the control head depends upon the tape speed.

Figure 9:
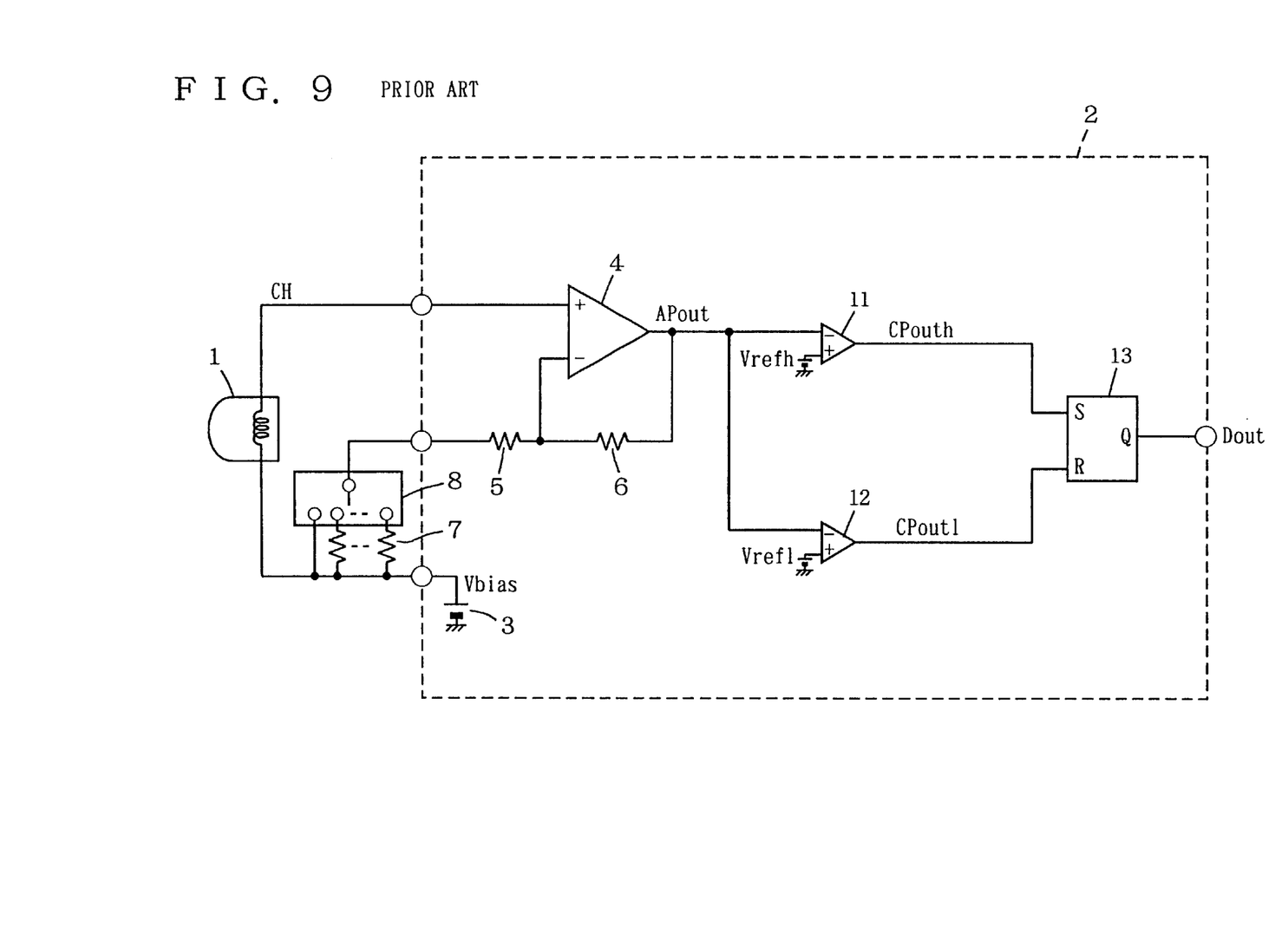
FIG. 9 is a circuit diagram showing a structure of a conventional VISS detection circuit.
Figure 10:
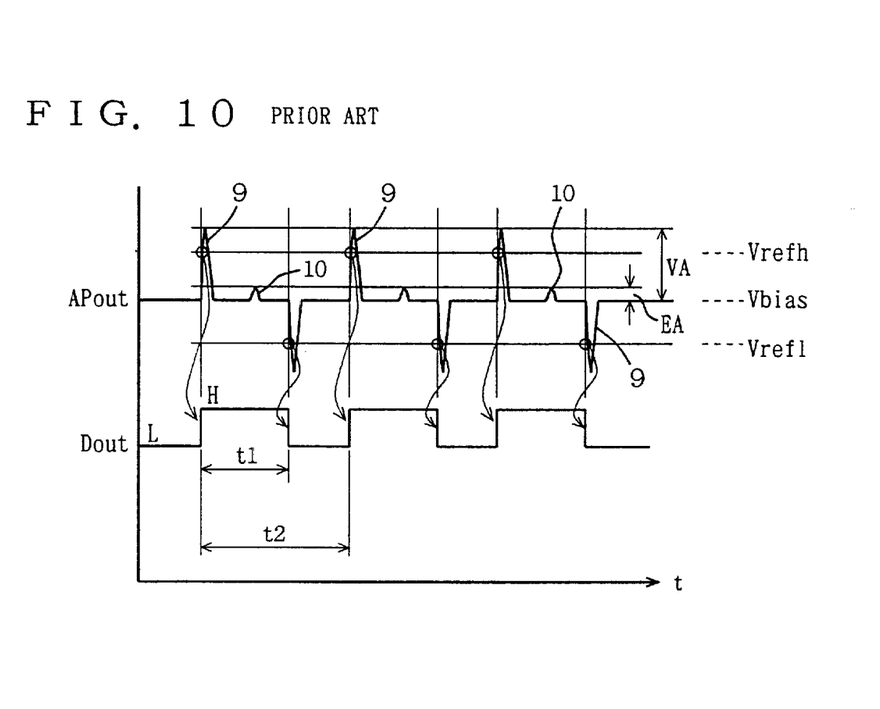
FIG. 10 is a timing chart showing an operation of the VISS signal detection circuit of FIG. 9.

FIG. 9 is a circuit diagram showing a structure of a conventional VISS signal detection circuit that can detect a VISS signal for both the cases of a high speed and a low speed tape. Referring to FIG. 9, a signal recorded on a magnetic tape is read out by a control head 1. A control head signal CH from control head 1 is applied to a VISS signal detection circuit 2. Control head signal CH is biased by a voltage Vbias by a bias power supply 3. Control head signal CH is amplified by a differential amplifier 4. The gain (amplification factor) of differential amplifier 4 is determined by resistors 5 and 6 and a resistor array 7. Resistor array 7 is formed of a plurality of resistors having various resistances. A switch circuit 8 switches the resistor in resistor array 7 according to the tape speed. More specifically, switch circuit 8 functions to switch the resistor in resistor array 7 so that the gain of differential amplifier 4 becomes greater when the tape speed is low and smaller when the tape speed is high. Therefore, the amplitude of a signal APout output from differential amplifier 4 is constant as shown in FIG. 10 regardless of the tape speed. Signal APout output from differential amplifier 4 includes erase noise 10 in addition to a signal VISS 9 of a large amplitude. Erase noise 10 is the noise that remains when the VISS signal is rewritten to 0 from 1 or vice versa. A VISS signal 9 higher than bias voltage Vbias is detected by a comparator 11 shown in FIG. 9. A VISS signal lower than bias voltage Vbias is detected by a comparator 12. Therefore, comparator 11 is supplied with a reference voltage Vrefh lower than the peak value of VISS signal 9 and higher than bias voltage Vbias. Similarly, comparator 12 is supplied with a reference voltage Vrefl. An output signal CPouth from comparator 11 is applied to the set terminal of a RS flip-flop circuit 13. An output signal CPoutl of comparator 12 is applied to the reset terminal of RS flip-flop circuit 13. Therefore, detection signal Dout from RS flip-flop 13 attains an H level (logical high) when output signal APout exceeds reference voltage Vrefh and an L level (logical low) when output signal APout exceeds reference voltage Vrefl. This signal Dout is the detection signal of a VISS signal. When the ratio of a term t1 to term t2 (duty ratio) is approximately 60%, recognition is made of 0. When the duty ratio is approximately 25%, recognition is made of 1. By recording such a VISS signal by a predetermined data pattern (for example, 011 . . . 110) on a magnetic tape, head position detection can be facilitated by detecting this VISS signal.

Figure 11:
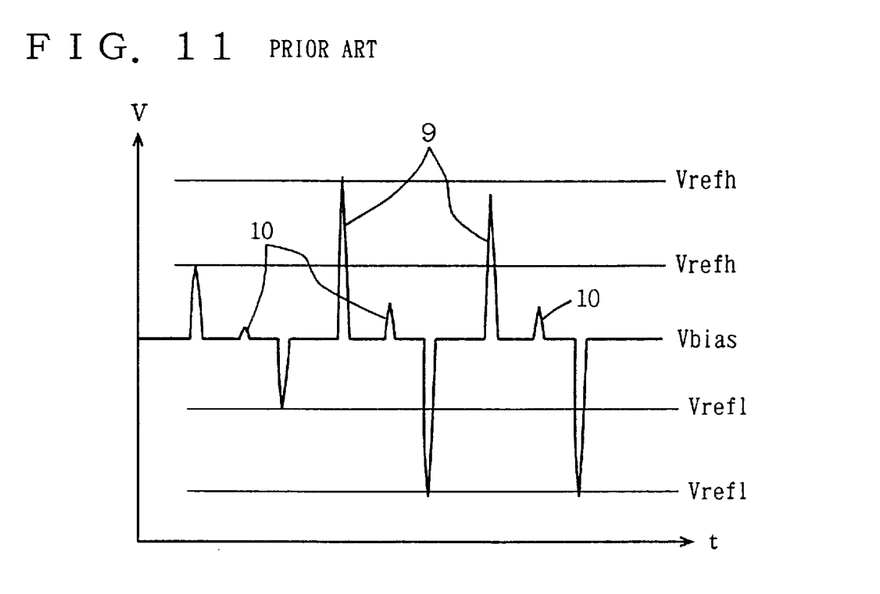
FIG. 11 is a timing chart showing an output signal from a differential amplifier to make clear the problem in the VISS signal detection circuit of FIG. 9.

By switching the gain of differential amplifier 4 according to the tape speed, the amplitude of the signal read out by control head 1 can be made constant substantially. However, the amplitude of this signal varies slightly as shown in FIG. 11 even when the tape speed is constant. Although all the peaks of VISS signal 9 can be detected by setting reference voltage Vrefh of comparator 11 low and reference voltage Vrefl of comparator 12 high, there is a possibility of erroneous detection of erase noise 10 as a peak of VISS signal 9. In contrast, if reference voltage Vrefh of comparator 11 is set high and reference voltage Vrefl of comparator 12 is set low, there is a possibility of not detecting all the peaks of VISS signal 9 although no erase noise 10 will be detected erroneously. There will be no problem if reference voltages Vrefh and Vrefl are set intermediate the peak of VISS signal 9 and the peak of erase noise 10. However, this setting is not so easy since the amplitude of erase noise 10 differs depending upon the tape speed and the like.

When VISS signal detection circuit 2 of FIG. 9 is employed, resistor array 7 must be externally controlled by a microcomputer and the like. However, it is difficult to implement task sharing with another real time task since the microcomputer will exclusively carry out this detection task during the VISS signal detection.

SUMMARY OF THE INVENTION

In view of the foregoing, an object of the present invention is to provide a VISS signal detection circuit that can properly detect a VISS signal.

Another object of the present invention is to provide a VISS signal detection circuit that can always detect a VISS signal properly even when the tape speed changes.

A further object of the present invention is to provide a VISS signal detection circuit that can detect a VISS signal properly even when the tape speed is constant.

Still another object of the present invention is to provide a VISS signal detection circuit that does not erroneously detect erase noise as a VISS signal.

A still further object of the present invention is to provide a VISS signal detection circuit that does not require external control.

According to an aspect of the present invention, a VISS signal detection circuit detecting a VISS signal recorded on a magnetic recording medium includes a plurality of first comparators, a plurality of second comparators, a select circuit, and an output circuit. The plurality of first comparators have a threshold value differing from each other. Each first comparator compares the level of the VISS signal with its threshold value to supply an output signal when the level of the VISS signal is higher than the threshold value. The plurality of second comparators have a threshold value differing from each other. Each second comparator compares the level of the VISS signal with its threshold value to supply an output signal when the level of the VISS signal is lower than the threshold value. The select circuit selects the output signal from the comparator that has the second highest threshold value out of the first comparators supplying an output signal at the prior comparison, and the output signal from the comparator having the second lowest threshold value out of the second comparators supplying an output signal at the prior comparison. The output circuit provides a detection signal that is driven to a first level in response to one output signal from the select circuit and that is driven to a second level in response to the other output signal from the select circuit.

When the peak level of the VISS signal is detected in the above VISS signal detection circuit, the level of the threshold value to detect the next VISS signal is set slightly lower or higher than that detected peak level. Since the threshold value is reset to an optimum level every time a VISS signal is detected, a VISS signal can be detected reliably without erroneous detection of the erase noise.

Preferably, the VISS signal detection circuit further includes an amplifier. The amplifier amplifies by a constant gain the VISS signal to be applied to the plurality of first and second comparators. Therefore, it is not necessary to externally control the gain of the amplifier by a microcomputer and the like.

Preferably, the select circuit includes a plurality of first latch circuits, a plurality of second latch circuits, a first logic circuit, a plurality of third latch circuits, a plurality of fourth latch circuits, and a second logic circuit. The plurality of first latch circuits are provided corresponding to the plurality of first comparators. Each first latch circuit latches an output signal from a corresponding first comparator. The plurality of second latch circuits are provided corresponding to the plurality of fist latch circuits. Each second latch circuit latches an output signal from a corresponding first latch circuit. The first logic circuit selects the output signal from the comparator having the second highest value among the first comparators supplying an output signal at the prior comparison in response to the plurality of second latch circuits. The plurality of third latch circuits are provided corresponding to the plurality of second comparators. Each third latch circuit latches an output signal from a corresponding second comparator. The plurality of fourth latch circuits are provided corresponding to the plurality of third latch circuits. Each fourth latch circuit latches the output signal from a corresponding third latch circuit. The second logic circuit selects the output signal from the comparator having the second lowest threshold value among the second comparators supplying an output signal at the prior comparison in response to the plurality of fourth latch circuits.

In the above VISS signal related circuits, the maximum peak level of the VISS signal in the prior comparison by the first comparator is retained at the second latch circuit. Therefore, the threshold value of the current comparison is set slightly lower than the threshold value level of the prior comparison. The smallest peak level of the VISS signal at the prior comparison is retained in the fourth latch circuit. Therefore, the threshold value level of the current comparison is set slightly higher than the threshold value level of the prior comparison.

Preferably, the output circuit includes a flip-flop circuit. The flip-flop is set in response to one output signal from the select circuit and reset in response to the other output signal of the select circuit.

Preferably, the VISS signal detection circuit further includes a first switching element and a second switching element. The first switching element is connected between the input terminal of the first comparator having the lowest threshold value out of the plurality of first comparators and the input terminal of the first comparator having the second lowest threshold value out of the plurality of first comparators, and is turned on in response to the output signal from the first comparator having the lowest threshold value. The second switching element is connected between the input terminal of the second comparator having the highest threshold value out of the plurality of second comparators and the input terminal of the second comparator having the second highest threshold value out of the plurality of second comparators, and is turned on in response to the output signal from the second comparator having the highest threshold value.

When the first comparator having the lowest threshold value does not supply an output signal in the above VISS signal detection circuit, the VISS signal is supplied only to the first comparator that has the lowest threshold value, and is not supplied to the other first comparators. When the second comparator having the highest threshold value does not supply an output signal, the VISS signal is supplied only to the second comparator having the highest threshold value, and is not supplied to the other second comparators. More specifically, the first switching element is turned on only during the period where the first comparator having the lowest threshold value supplies an output signal, and the second switching element is turned on only during the period where the second comparator having the highest threshold value supplies an output signal. Therefore, the input capacitance can be suppressed at a low level even when there are many first and second comparators.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described hereinafter with reference to the drawings. In the drawings, the same or corresponding components have the same reference characters allotted, and their description will not be repeated.

First Embodiment

Figure 1:
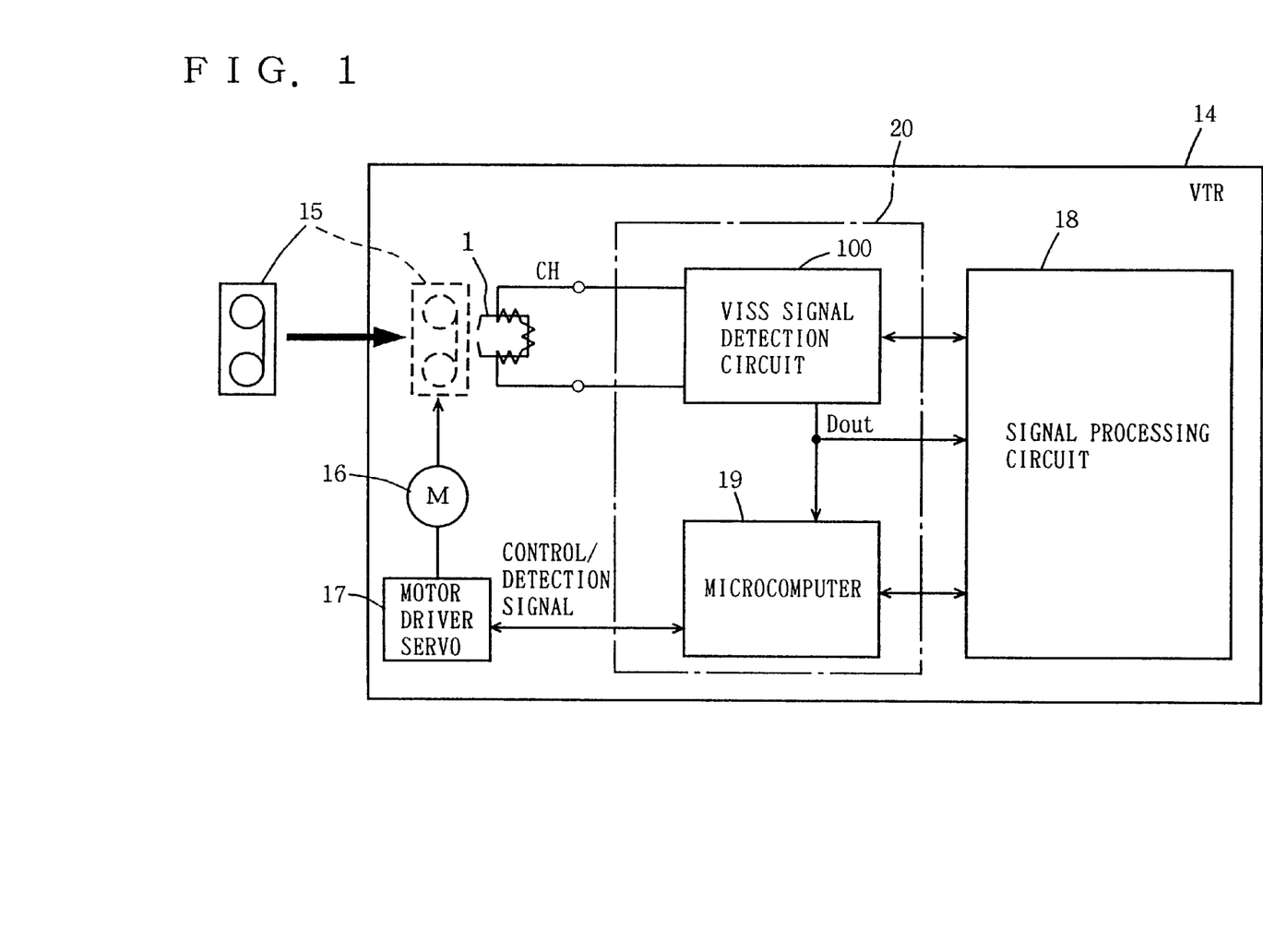
FIG. 1 is a block diagram showing an entire structure of a VTR including a VISS signal detection circuit according to a first embodiment of the present invention.

FIG. 1 is a block diagram showing an entire structure of a VTR 14 including a VISS signal detection circuit 100 according to a first embodiment of the present invention. Referring to FIG. 1, VTR 14 includes a motor 16 driving a magnetic tape cassette 15, a motor driver servo 17 providing the servo control of motor 16, a control head 1 detecting a signal recorded on a magnetic tape in magnetic tape cassette 15, a VISS signal detection circuit 100 detecting a VISS signal in response to a control head signal CH output from control head 1, a signal processing circuit 18 for processing various signals read out from the magnetic tape, and a microcomputer 19 for controlling motor driver servo 17 and signal processing circuit 18. Here, VISS signal detection circuit 100 and microcomputer 19 are formed in a one-chip semiconductor integrated circuit device 20.

Figure 2:
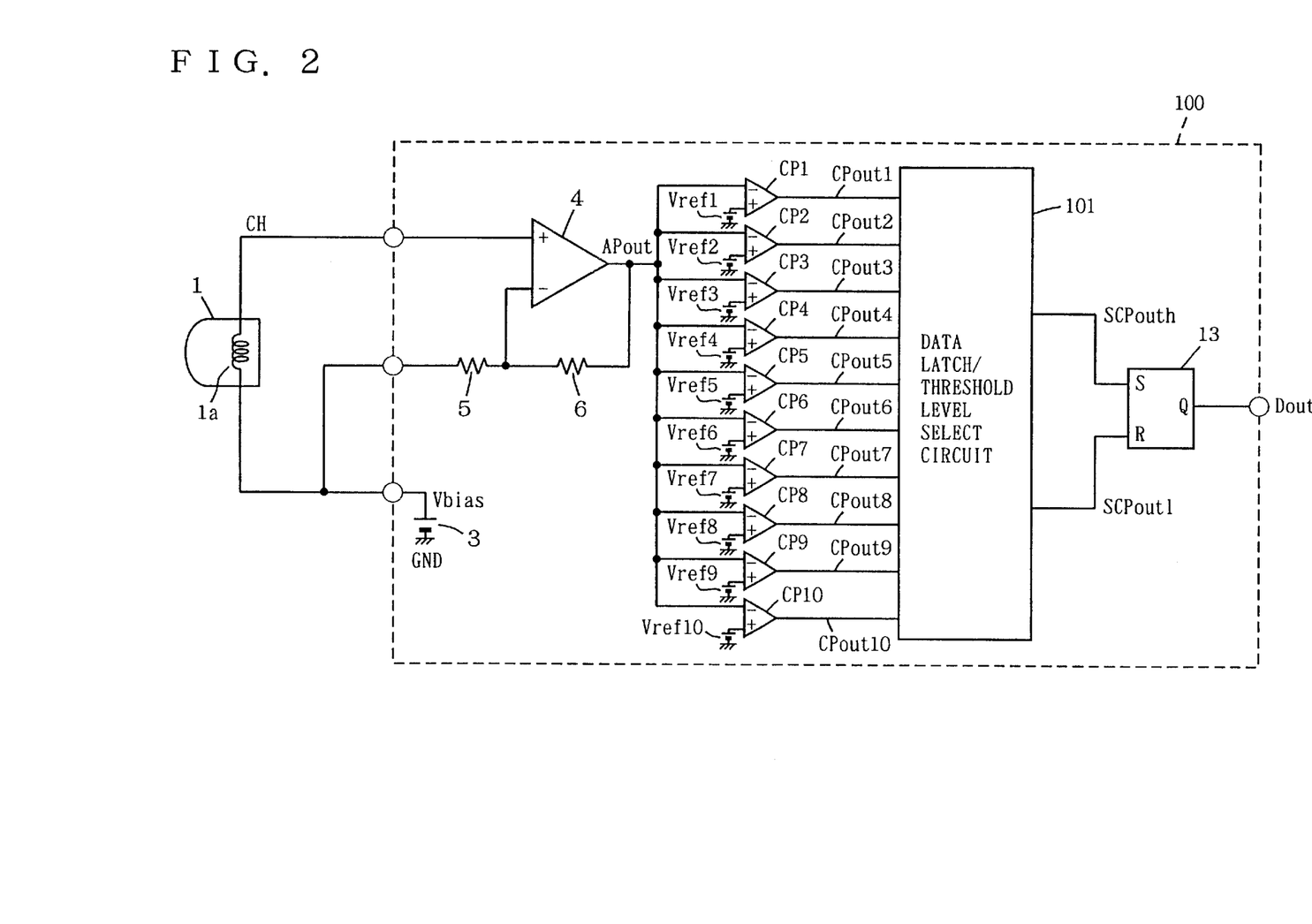
FIG. 2 is a block diagram showing a structure of the VISS signal detection circuit in FIG. 1.

FIG. 2 is a block diagram showing a structure of VISS signal detection circuit 100 of FIG. 1. Referring to FIG. 2, VISS signal detection circuit 100 includes a bias power supply 3, a differential amplifier 4, resistors 5 and 6, a plurality of comparators CP1–CP10, a data latch/threshold level select circuit 101, and a RS flip-flop circuit 13.

Bias power supply 3 supplies a bias voltage Vbias to a head coil 1a in control head 1. Control head signal CH from control head 1 is applied to a noninverting input terminal (+) of differential amplifier 4. The inverting input terminal (−) of differential amplifier 4 is connected to bias power supply 3 via resistor 5. Output signal APout of differential amplifier 4 is fed back to the inverting input terminal (−) via resistor 6. Therefore, differential amplifier 4 amplifies control head signal CH by a constant gain determined by resistors 5 and 6.

Output signal APout of differential amplifier 4 is applied to each inverting input terminal (−) of comparators CP1–CP10. Reference voltages Vref1–Vref10 are applied to the noninverting input terminals (+) of comparators CP1–CP10, respectively. Here, the relationship of Vref1>Vref2>Vref3>Vref4>Vref5>Vbias>Vref6>Vref7>Vref8>Vref9>Vref10>GND is established. Therefore, comparators CP1–CP10 have a threshold value differing from each other. Each of comparators CP1–CP10 compares the level of output signal APout from differential amplifier 4 with the level of the corresponding one of reference voltages Vref1–Vref10. Each of comparators CP1–CP5 supplies an output signal of an L level to data latch/threshold level select circuit 101 when the level of output signal APout is higher than the corresponding reference voltage. For example, when the level of output signal APout of comparator CP1 is higher than the level of reference voltage Vref1, an output signal CPout1 of an L level is provided to data latch/threshold level select circuit 101. Each of comparators CP6–CP10 supplies an output signal of an H level to data latch/threshold level select circuit 101 when the level of output signal APout is lower than the level of the corresponding reference voltage. For example, when the level of output signal APout of comparator CP10 is lower than the level of reference voltage Vref10, an output signal CPout10 of an H level is provided to data latch/threshold level select circuit 101.

Data latch/threshold level select circuit 101 stores the maximum level of output signal APout from differential amplifier 4 by latching output signals CPout1–CPout5 from comparators CP1–CP5, respectively. Also, data latch/threshold level select circuit 101 stores the minimum level of output signal APout from differential amplifier 4 by latching output signals CPout5–CPout10 from comparators CP6–CP10, respectively. Data latch/threshold level select circuit 101 retains the comparison results by comparators CP1–CP10 to select one of output signals CPout1–CPout5 according to the prior comparison result and current comparison result to supply the selected signal to the set terminal of RS flip-flop circuit 13 as a select output signal SCPouth, and selects one of output signals CPout6–CPout10 to supply the selected signal to the reset terminal of RS flip-flop circuit 13 as select output signal SCPoutl. More specifically, data latch/threshold level select circuit 101 selects as output signal SCPouth the signal output from the comparator that receives the second highest reference voltage out of the comparators supplying an output signal of an L level at the prior comparison, and selects as output signal SCPoutl the output signal from the comparator that receives the second lowest reference voltage out of the comparators supplying an output signal of an H level at the prior comparison.

RS flip-flop circuit 13 is set in response to output signal SCPouth and reset in response to output signal SCPoutl from data latch/threshold level select circuit 101. Therefore, RS flip-flop circuit 13 outputs a detection signal Dout that is driven to an H level in response to select output signal SCPouth and to an L level in response to select output signal SCPoutl, respectively.

Figure 3:
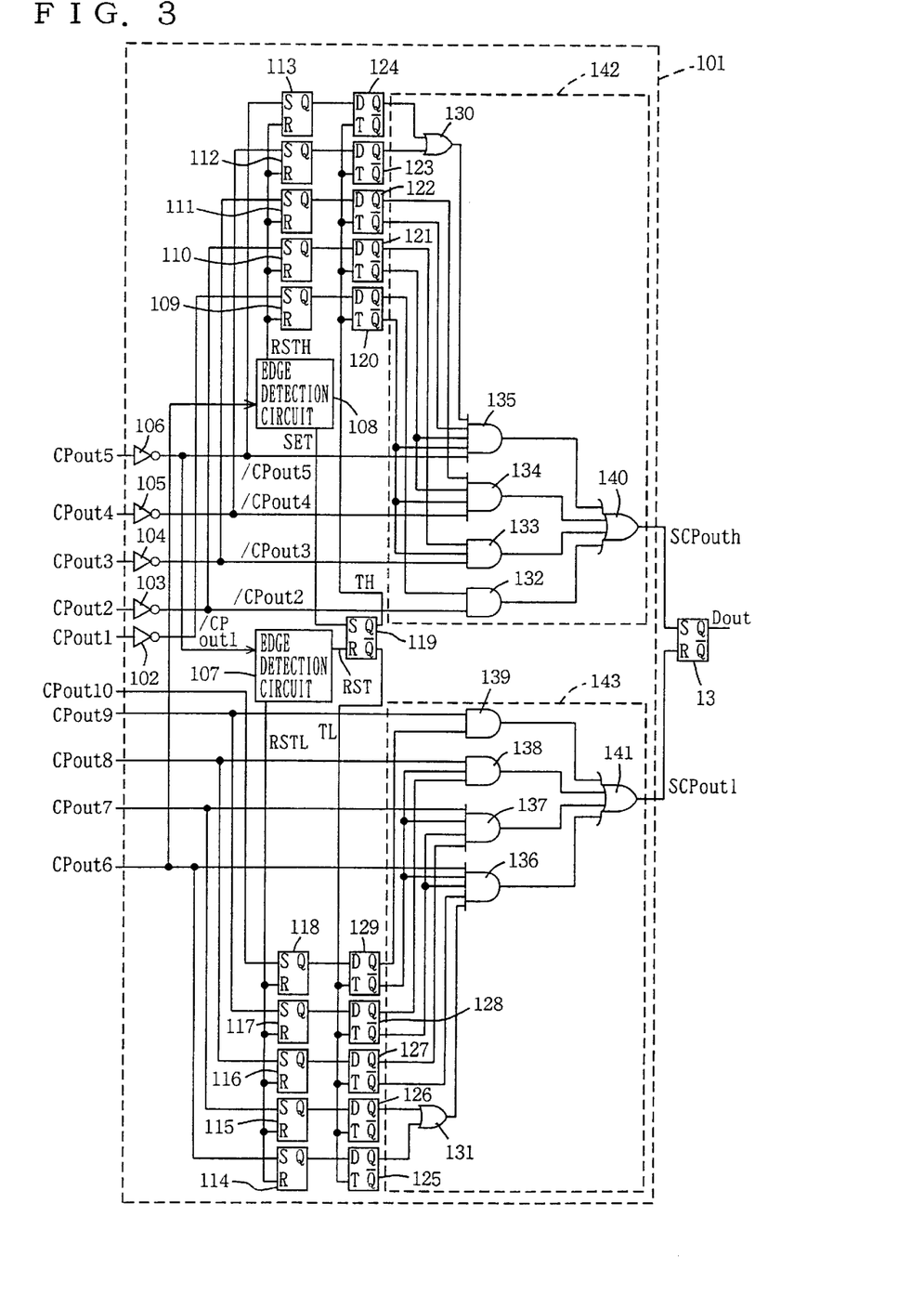
FIG. 3 is a block diagram showing a structure of a data latch/threshold level select circuit in FIG. 2.

FIG. 3 is a block diagram showing a structure of data latch/threshold level select circuit 101 of FIG. 2. Referring to FIG. 3, data latch/threshold level select circuit 101 includes inverter circuits 102–106, edge detection circuits 107 and 108, RS flip-flop circuits 109–118, RS flip-flop circuit 119, D flip-flop circuits 120–129, OR circuits 130 and 131, AND circuits 132–139, and OR circuits 140 and 141.

Inverter circuits 102–106 receive output signals CPout1–CPout5 from comparators CP1–CP5, respectively, to supply inverted output signals /CPout1–/CPout5 to RS flip-flop circuits 109–113, respectively. Output signals /CPout2–/CPout5 are also applied to AND circuits 132–135, respectively. Output signal CPout5 is also applied to edge detection circuit 107. Output signals CPout6–CPout10 from comparators CP6–CP10 are also applied to RS flip-flop circuits 114–118, respectively. Output signals CPout6–CPout9 are also applied to AND circuit 136–139, respectively. Output signal CPout6 is also applied to edge detection circuit 108.

Edge detection circuit 107 detects the rising edge of output signal /CPout5 to generate a reset signal RST and detects a falling edge of output signal /CPout5 to generate a reset signal RSTL. Edge detection circuit 108 detects a rising edge of output signal CPout6 to generate a set signal SET and detects a falling edge of output signal CPout6 to generate a reset signal RSTH.

Figure 4:
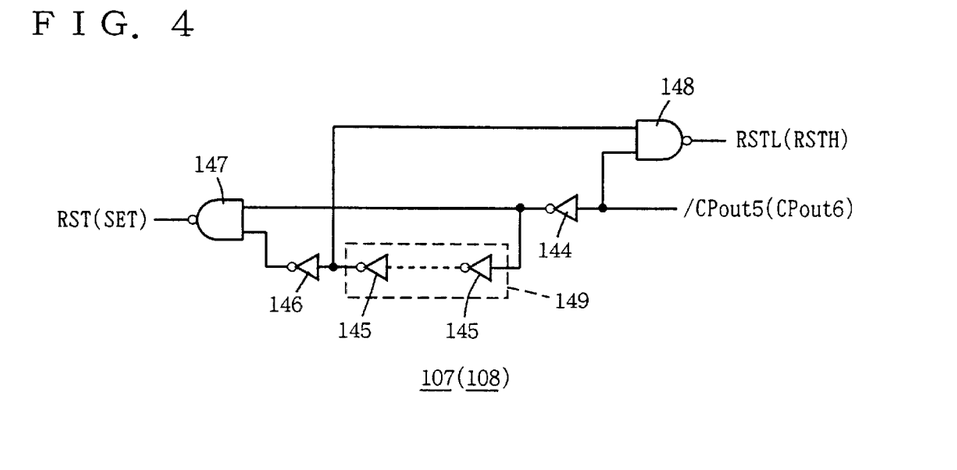
FIG. 4 is a circuit diagram showing a structure of an edge detection circuit of FIG. 3.

FIG. 4 is a circuit diagram showing a structure of edge detection circuit 107 or 108 of FIG. 4. Referring to FIG. 4, edge detection circuit 107 or 108 includes inverter circuits 1444–146, and NAND circuits 147 and 148. An even number of inverter circuits 145 connected in series form a delay circuit 149. Therefore, inverter circuits 145 and 146 and NAND circuit 147 form a one shot circuit to generate reset signal RST or set signal SET. Inverter circuits 144 and 145 and NAND circuit 148 form a one shot circuit to generate reset signal RSTL or RSTH.

Figure 5:
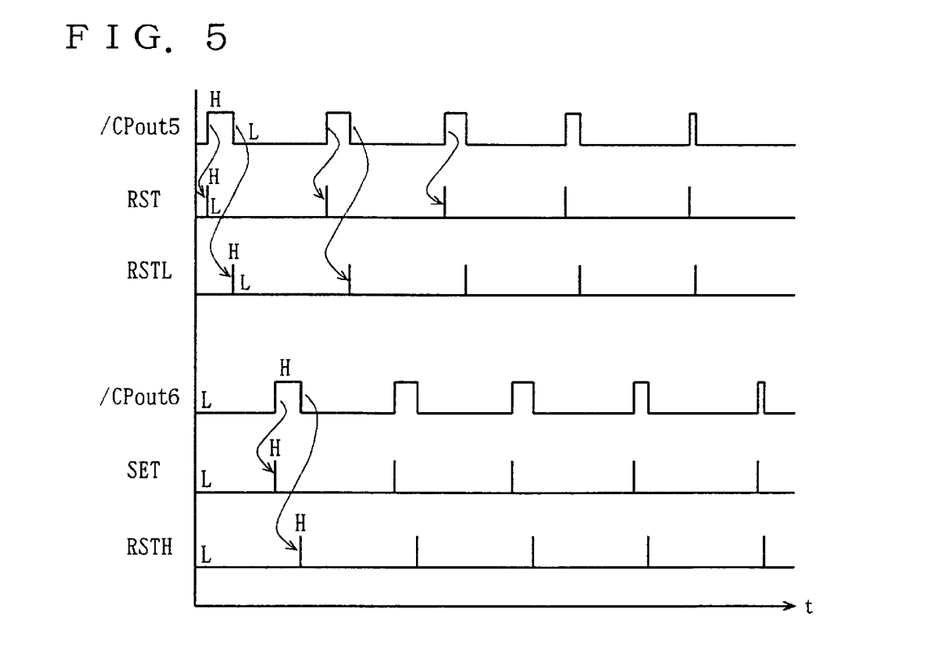
FIG. 5 is a timing chart showing an operation of the edge detection circuit of FIG. 4.

FIG. 5 is a timing chart showing an operation of edge detection circuits 107 and 108 of FIG. 4. As shown in FIG. 5, reset signal RST attains an H level in response to the rising edge of output signal /CPout5 and reset signal RSTL attains an H level in response to the falling edge of output signal /CPout5 by edge detection circuit 107. Also, set signal SET attains an H level in response to a rising edge of output signal CPout6 and reset signal RSTH attains an H level in response to a falling edge of output signal CPout6 by edge detection circuit 108.

Referring to FIG. 3 again, RS flip-flop circuits 109–113 are provided corresponding to comparators CP1–CP5 shown in FIG. 2. RS flip-flop circuits 109–113 are reset in response to a common reset signal RSTH from edge detection circuit 108, and set in response to output signals /CPout1–/CPout5. Therefore, RS flip-flop circuits 109–113 latch output signals /CPout1–/CPout5.

RS flip-flop circuits 114–118 are provided corresponding to comparators CP6–CP10. RS flip-flop circuits 114–118 are reset in response to a common reset signal RSTL from edge detection circuit 107, and set in response to output signals CPout6–CPout10. Therefore, RS flip-flop circuits 114–118 latch output signals CPout6–CPOut10, respectively.

RS flip-flop circuit 119 is reset in response to reset signal RST from edge detection circuit 107 to apply a transfer signal TL of an H level to D flip-flop circuits 125–129. RS flip-flop circuit 119 is set in response to set signal SET from edge detection circuit 108 to apply transfer signal TH of an H level to D flip-flop circuits 120–124.

D flip-flop circuits 120–124 are provided corresponding to RS flip-flop circuits 109–113 to latch the output signals from RS flip-flop circuits 109–113, respectively, in response to transfer signal TH of an H level. D flip-flop circuits 125–129 are provided corresponding to RS flip-flop circuits 114–118 to latch the output signals from RS flip-flop circuits 114–118, respectively, in response to transfer signal TL of an H level.

OR circuit 130, AND circuits 132–135 and OR circuit 140 form a select circuit 142 selecting any one of output signals CPout1–CPout5 to generate a select output signal SCPouth. More specifically, select circuit 142 formed by the logic circuits selects the output signal from the comparator receiving the second highest reference voltage out of the comparators supplying an output signal at the prior comparison in response to the signals latched in D flip-flop circuits 120–124.

OR circuit 131, AND circuits 136–139 and OR circuit 141 form a select circuit 143 selecting any one of output signals CPout6–CPout10 to generate a select output signal SCPout1. More specifically, select circuit 143 formed by the logic circuits selects the output signal from the comparator receiving the second lowest reference voltage out of the comparators supplying an output signal at the prior comparison in response to the signals latched in D flip-flop circuits 125–129.

Figure 6:
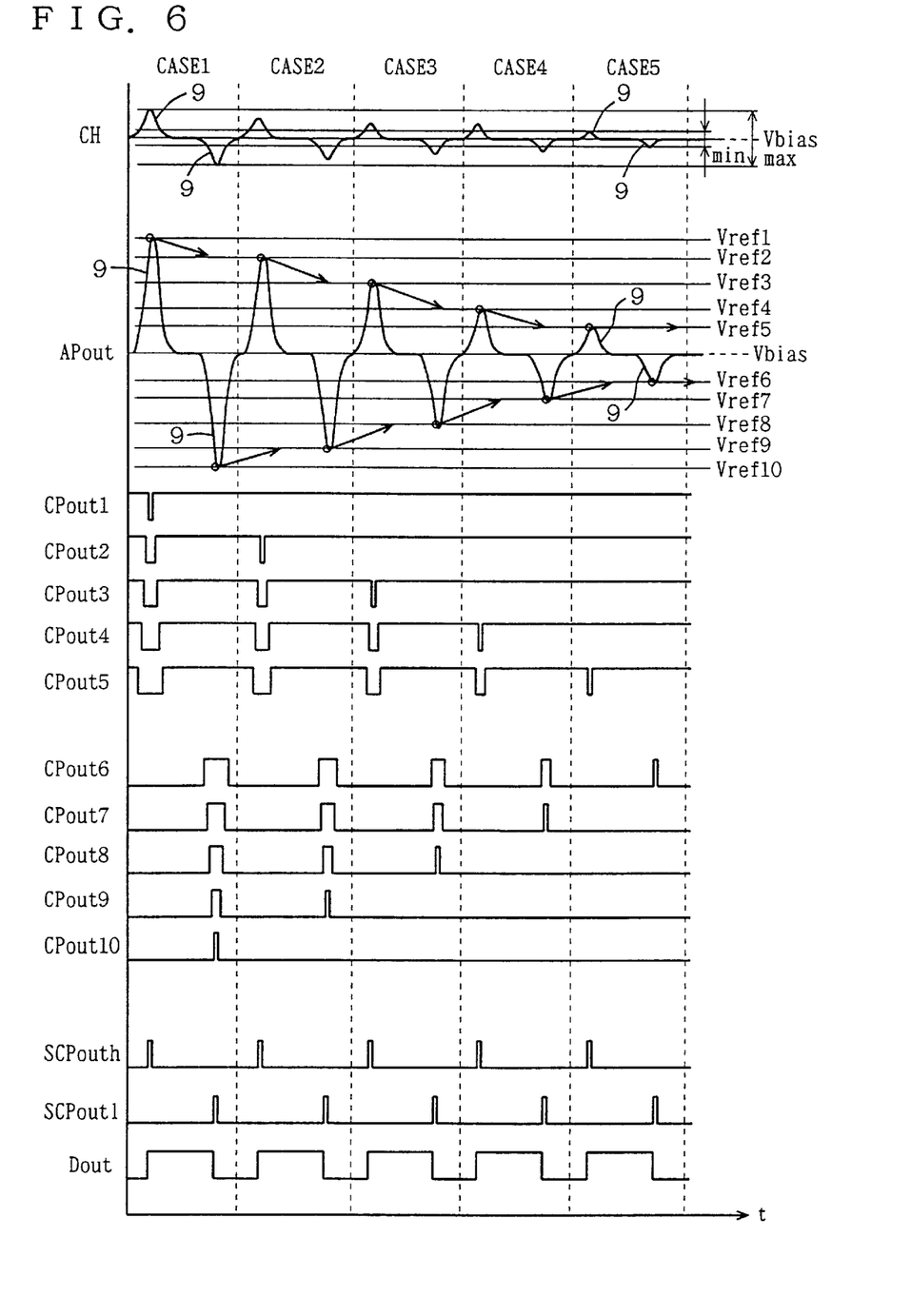
FIG. 6 is a timing chart showing an operation of the VISS signal detection circuit of FIG. 2 with respect to five different tapes speeds.

The operation of the above VISS signal detection circuit 100 will be described hereinafter. FIG. 6 is a timing chart showing the operation for five different cases of the tape speed: CASE1–CASE5. Here, the tape speed becomes higher towards CASE1 and lower towards CASE5.

The signal recorded on a magnetic tape is detected by control head 1, whereby control head signal CH biased by voltage Vbias is applied to differential amplifier 4. Control head signal CH includes the above-described erase noise (not shown) in addition to VISS signal 9 shown in FIG. 6. Control head signal CH has an amplitude centered about bias voltage Vbias. The amplitude thereof becomes greater as the tape speed is higher and smaller as the tape speed is lower.

Then, control head signal CH is amplified by a constant gain by differential amplifier 4 to obtain output signal APout shown in FIG. 6. Since the gain of differential amplifier 4 is constant, the amplitude of output signal APout becomes greater as the tape speed is higher and smaller as the tape speed is lower.

When the level of output signal APout becomes higher than reference voltage Vref5 for comparator CP5, output signal CPout5 of comparator CP5 is pulled down to an L level from an H level. When the level of output signal APout further becomes higher than reference voltage Vref4, output signal CPout4 of comparator CP4 is pulled down to an L level from an H level. When the level of output signal APout becomes higher than reference voltage Vref3, output signal CPout3 of comparator CP3 is pulled down from an H level to an L level. When the level of output signal APout becomes higher than reference voltage Vref2, output signal CPout2 is pulled down to an L level from an H level. When the level of output signal APout becomes higher than the highest reference voltage Vref1, output signal CPout1 of comparator CP1 is pulled down from an H level to an L level.

When output signal APout exceeds the highest peak and then becomes lower than reference voltage Vref2, output signal CPout1 returns to an H level from an L level. When the level of output signal APout falls to the level of bias voltage Vbias, output signals CPout2–CPout5 are sequentially pulled up from the L level to an H level.

In CASE1 where the peak level of output signal APout is highest, all output signals CPout1–CPout5 attain an L level. In CASE5 where the peak level of output signal APout is lowest, only output signal CPout5 attains an L level.

When the level of output signal APout becomes lower than reference voltage Vref6 of comparator CP6, output signal CPout6 of comparator CP6 is pulled up to an H level from an L level. When the level of output signal APout becomes lower than reference voltage Vref7, output signal APout 7 is pulled up from an L level to an H level. When the level of output signal APout becomes lower than reference voltage Vref8, output signal APout8 is pulled up to an H level from an L level. When the level of output signal APout becomes lower than reference voltage Vref9, output signal CPout9 is pulled up to an H level from an L level. When the level of output signal APout becomes lower than reference voltage Vref10, output signal APout10 is pulled up to an H level from an L level.

When the level of output signal APout exceeds the minimum peak and becomes higher than reference voltage Vref9, output signal APout9 returns to an L level from an H level. When the level of output signal APout rises to the level of bias voltage Vbias, output signals CPout9–CPout6 sequentially return to the L level from the H level.

In CASE1 where the peak level of output signal APout is lowest, all output signals CPout6–CPout10 attain an H level. In CASE5 where the peak level of output signal APout is highest, only output signal CPout6 attains an H level.

Output signals CPout1–CPout10 from comparators CP1–CP10 are applied to data latch/threshold level select circuit 101.

Output signals CPout1–CPout5 from comparators CP1–CP5 are inverted by inverter circuits 102–106, respectively, in data latch/threshold level select circuit 101. The inverted output signals /CPout1–/CPout5 are latched in RS flip-flop circuits 109–113, respectively. The latch signals are transferred to D flip-flop circuits 120–124 to be latched.

TABLE 1

| | | | | | | |
|---|---|---|---|---|---|---|
| INPUT | /CPout1 | H | L | L | L | L |
| | /CPout2 | H | H | L | L | L |
| | /CPout3 | H | H | H | L | L |
| | /CPout4 | H | H | H | H | L |
| | /CPout5 | H | H | H | H | H |
| OUTPUT | 124Q | H | H | H | H | H |
| | 123Q | H | H | H | H | L |
| | 122Q | H | H | H | L | L |
| | 122Q̄ | L | L | L | H | H |
| | 121Q | H | H | L | L | L |
| | 121Q̄ | L | L | H | H | H |
| | 120Q | H | L | L | L | L |
| | 120Q̄ | L | H | H | H | H |
| | 135 output | L | L | L | H | H |
| | 134 output | L | L | H | L | L |
| | 133 output | L | H | L | L | L |
| | 132 output | H | L | L | L | L |

As shown in the above Table 1, when "HHHHH" is latched in D flip-flop circuits 120–124 as the prior comparison result by comparators CP1–CP5, the provision of output signals /CPout1–/CPout5 of "HHHHH" as the current comparison result by comparators CP1–CP5 causes only the output signal of AND circuit 132 among AND circuits 132–135 to attain an H level. As a result, select output signal SCPouth of an H level is output. This means that output signal CPout2 from comparator circuit CP2 receiving the second highest reference voltage Vref2 out of comparators CP1–CP5 supplying output signals CPout1–CPout5 of an L level at the prior comparison is selected by select circuit 142.

When output signals /CPout1–/CPout5 of "LHHHH" is applied as the current comparison result by comparators CP1–CP5 in the case where "LHHHH" is latched in D flip-flop circuits 120–124 as the prior comparison result of comparators CP1–CP5, only the output signal of inverter circuit 133 attains an H level. This means that output signal CPout3 from comparator CP3 receiving the second highest reference voltage Vref3 out of comparators CP2–CP5 supplying output signals CPout2–CPout5 of an L level at the prior comparison is selected by select circuit 142.

When output signals /CPout1–/CPout5 of "LLHHH" are applied as the current comparison result by comparators CP1–CP5 in the case where the signal of "LLHHH" is latched in D flip-flop circuits 120–124 as the prior comparison result of comparators CP1–CP5, only the output signal of AND circuit 134 attains an H level. This means that output signal CPout4 from comparator CP4 receiving the second highest reference voltage Vref4 out of comparators CP3–CP5 supplying an output signal of an L level at the prior comparison is selected by select circuit 142.

When output signals /CPout1–/CPout5 of "LLLHH" are applied as the current comparison result by comparators CP1–CP5 in the case where the signal of "LLLHH" is latched in D flip-flop circuits 120–124 as the prior comparison result of comparators CP1–CP5, only the output signal of AND circuit 135 attains an H level. This means that output signal CPout5 from comparator CP5 receiving the second highest reference voltage Vref5 out of comparators CP4 and CP5 supplying output signals CPout4 and CPout of an L level at the prior comparison is selected by select circuit 142.

When output signals /CPout1–/CPout5 of "LLLLH" are applied as the current comparison results by comparators CP1–CP5 in the case where the signal of "LLLLH" is latched in D flip-flop circuits 120–124 as the prior comparison result by comparators CP1–CP5, only the output signal of AND circuit 135 attains an H level. This means that output signal CPout5 of comparator CP5 that supplies an output signal of an L level at the prior comparison is selected by select circuit 142.

TABLE 2

| | | | | | | |
|---|---|---|---|---|---|---|
| INPUT | CPout10 | H | L | L | L | L |
| | CPout9 | H | H | L | L | L |
| | CPout8 | H | H | H | L | L |
| | CPout7 | H | H | H | H | L |
| | CPout6 | H | H | H | H | H |
| OUTPUT | 125Q | H | H | H | H | H |
| | 126Q | H | H | H | H | L |
| | 127Q | H | H | H | L | L |
| | 127Q̄ | L | L | L | H | H |
| | 128Q | H | H | L | L | L |
| | 128Q̄ | L | L | H | H | H |
| | 129Q | H | L | L | L | L |
| | 129Q̄ | L | H | H | H | H |
| | 136 output | L | L | L | H | H |
| | 137 output | L | L | H | L | L |
| | 138 output | L | H | L | L | L |
| | 139 output | H | L | L | L | L |

As shown in the above Table 2, when output signals CPout6–CPout10 of "HHHHH" are applied as the current comparison result by comparators CP6–CP10 when the signal of "HHHHH" is latched in D flip-flop circuit 129 as the prior comparison result by comparators CP6–CP10, only the output signal of AND circuit 139 attains an H level. This means that output signal CPout9 from comparator CP9 receiving the second lowest reference voltage Vref9 out of comparators CP6–CP10 supplying output signals CPout6–CPout10 of an H level at the prior comparison is selected by select circuit 134. The remaining cases shown in Table 2 are similar to those of Table 1.

Figure 7:
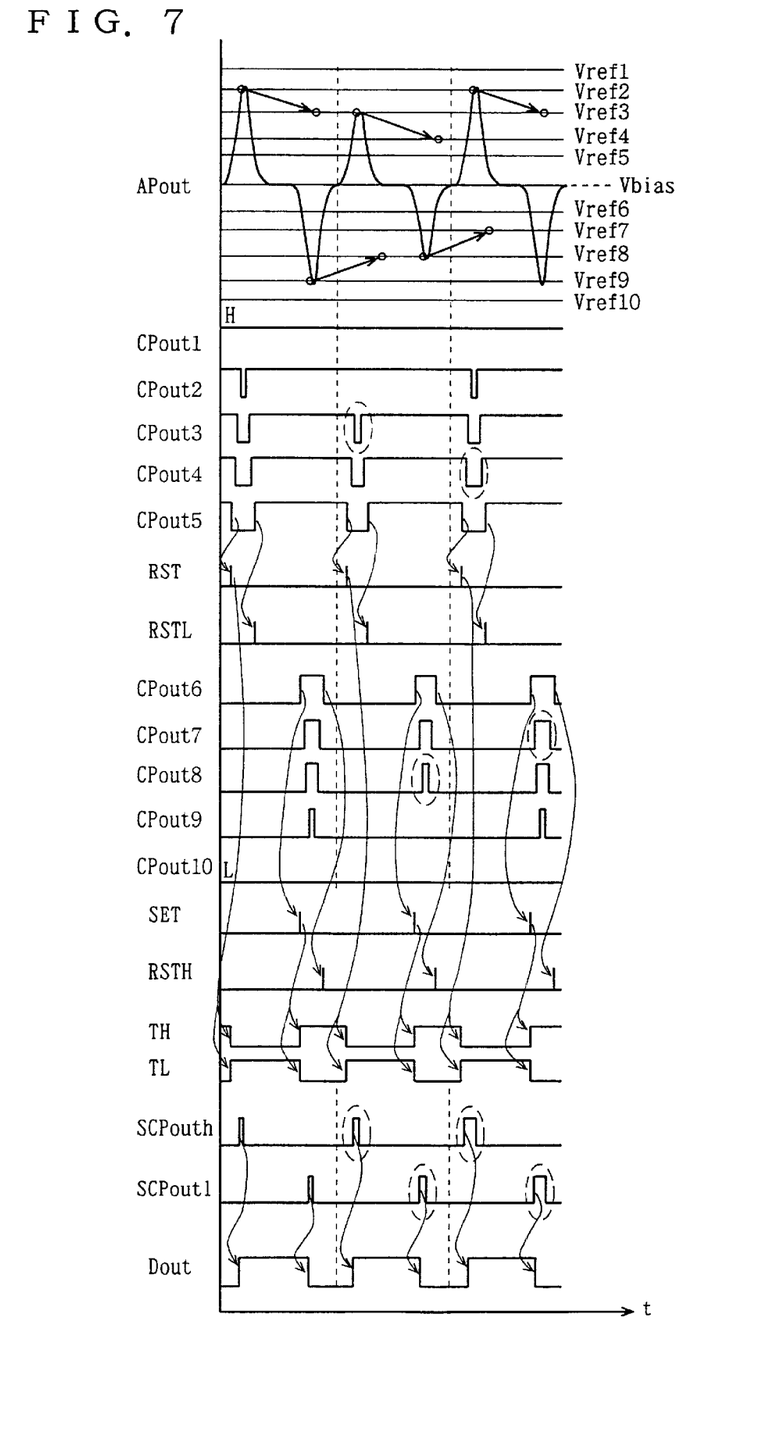
FIG. 7 is a timing chart showing an operation of the VISS signal detection circuit when the peak level of the output signal from the differential amplifier of FIG. 2 falls and then rises again.

The operation where the highest peak level of output signal APout from differential amplifier 4 falls and then rises, i.e., the lowest peak level rises and then falls again, will be described with reference to the timing chart of FIG. 7.

When the highest and lowest peak levels of the output signal APout exceed reference voltages Vref2 and Vref9, respectively, a signal of "LHHHH" is latched in RS flip-flop circuits 109–113. When set signal SET attains an H level in response to a rising edge of output signal CPout6, transfer signal TH is pulled up to an H level, whereby the signal of "LHHHH" in RS flip-flop circuits 109–113 is transferred to D flip-flop circuits 120–124. Also the signal of "HHHHL" is latched in RS flip-flop circuits 114–118.

When the highest peak level of output signal APout exceeds reference voltage Vref3, a signal of "LLHHH" is latched in RS flip-flop circuits 109–113. When reset signal RST attains an H level in response to a falling edge of output signal CPout5, transfer signal TL is pulled up to an H level, whereby the signal of "HHHHL" in RS flip-flop circuits 114–118 is transferred to D flip-flop circuits 125–129.

Since comparators CP2–CP5 supply an output signal of an L level at the previous comparison, output signal CPout3 from comparator CP3 receiving the second highest reference voltage Vref3 is selected as output signal SCPouth. In contrast, comparators CP6–CP9 supply an output signal of an H level at the prior comparison. Therefore, output signal CPout8 from comparator CP8 receiving the second lowest reference voltage Vref8 is selected as output signal SCPout1.

When the highest peak level of output signal APout exceeds reference voltage Vref2, output signal CPout4 from comparator CP4 receiving the second highest reference voltage Vref4 out of comparators CP3–CP5 supplying an output signal of an H level at the prior comparison is selected as output signal SCPouth.

When the level of the smallest peak of output signal APout exceeds reference voltage Vref9, output signal CPout7 from comparator CP7 receiving the second lowest reference voltage Vref7 out of comparators CP6–CP8 supplying an output signal of an H level at the prior comparison is selected as output signal SCPout1.

Detection signal Dout of the VISS signal output from RS flip-flop circuit 13 attains an H level in response to select output signal SCPouth and an L level in response to select output signal SCPout1. The index code used for head position detection and the like is recognized according to the duty ratio of detection signal Dout.

The threshold value to detect a VISS signal is reset every time a VISS signal is detected. More specifically, when the peak level of output signal APout exceeds reference voltage Vref2, the threshold value is reset to the level of reference voltage Vref3 that is lower than reference voltage Vref2 by 1. Therefore, a VISS signal can be detected as long as the peak level of the next output signal APout exceeds reference voltage Vref3.

According to the first embodiment, the level of the next threshold value is reset to become slightly lower than the current peak level according to the peak level of the signal detected from the magnetic tape. Therefore, a VISS signal can be reliably detected even when the peak level is varied according to the tape speed. Also a VISS signal can be reliably detected even when the peak level is altered when the tape speed is constant. Also, erase noise will not be erroneously detected as a VISS signal.

Since the gain of differential amplifier 4 is constant and VISS signal detection circuit 10 does not require external control by microcomputer 19, microcomputer 19 can provide control other than the detection control of a VISS signal.

The method of setting reference voltages Vref1–Vref10 for comparators CP1–CP10 will be described hereinafter.

Reference voltages Vref1-Vref10 can be determined by the standard of the erase noise. As to the standard of the erase noise, the level VA of the VISS signal and the level EA of the erase noise shown in FIG. 10 has the following relationship.

$$20 \log(EA/VA) < -20$$

More specifically, the erase noise must be less than 1/10 the VISS signal. In the following, reference voltages Vref1–Vref10 are determined so as to satisfy this relationship.

First, reference voltages Vref1–Vref5 for comparators CP1–CP5 are set as set forth in the following.

First, reference voltage Vref5 is determined. Reference voltage Vref5 is set to allow detection of the minimum level of control head signal CH. More specifically, even in CASE5 where the tape speed is slowest in FIG. 6, reference voltage Vref5 is set to a level where the peak of the VISS signal is detected and the erase noise is not detected. The level of the VISS signal is apparent from the tape speed and the material of the magnetic tape.

Reference voltages Vref4–Vref1 are sequentially determined to satisfy the following relationship.

VISS signal maximum peak in CASE1<Vref4<VISS signal maximum peak in CASE2.

VISS signal maximum peak in CASE2<Vref3<VISS signal maximum peak in CASE3.

VISS signal maximum peak in CASE3<Verf 2<VISS signal maximum peak in CASE4.

VISS signal maximum peak in CASE4<Vref1<VISS signal maximum peak in CASE5.

In a similar manner, reference voltages Vref6–Vref10 for comparators CP6–CP10 are set as set forth in the following. First, reference voltage Vref6 is set to allow detection of the minimum level of control head signal CH. Then, reference voltages Vref7–Vref10 are sequentially determined so as to satisfy the following relationship.

VISS signal minimum peak in CASE1>Vref7>VISS signal minimum peak in CASE2.

VISS signal minimum peak in CASE2>Vref8>VISS signal minimum peak in CASE3.

VISS signal minimum peak in CASE3>Vref9>VISS signal minimum peak in CASE4.

VISS signal minimum peak in CASE4>Vref10>VISS signal minimum peak in CASE5.

When the maximum and minimum amplitude of control head signal CH read out from control head 1 is 70 mV and 0.35 mV, respectively, and the gain of differential amplifier 4 is 49.54 dB, reference voltages Vref1–Vref10 can be set to the following values, provided that bias voltage Vbias is set to 2.5 V.

Vref1=Vbias+1.300(V)=3.800 (V)
Vref2=Vbias+1.167(V)=3.667 (V)
Vref3=Vbias+0.405(V)=2.905 (V)
Vref4=Vbias+0.180(V)=2.680 (V)
Vref5=Vbias+0.045(V)=2.545 (V)
Vref6=Vbias−0.045(V)=2.455 (V)
Vref7=Vbias−0.180(V)=2.320 (V)
Vref8=Vbias−0.405(V)=2.095 (V)
Vref9=Vbias−1.167(V)=1.333 (V)
Vref10=Vbias−1.300(V)=1.200 (V)

Although the number of comparators must be increased or decreased according to the voltage level range (rate-determined by tape speed and the like) of control head signal CH, ten comparators are provided in the present embodiment.

Second Embodiment

Figure 8:
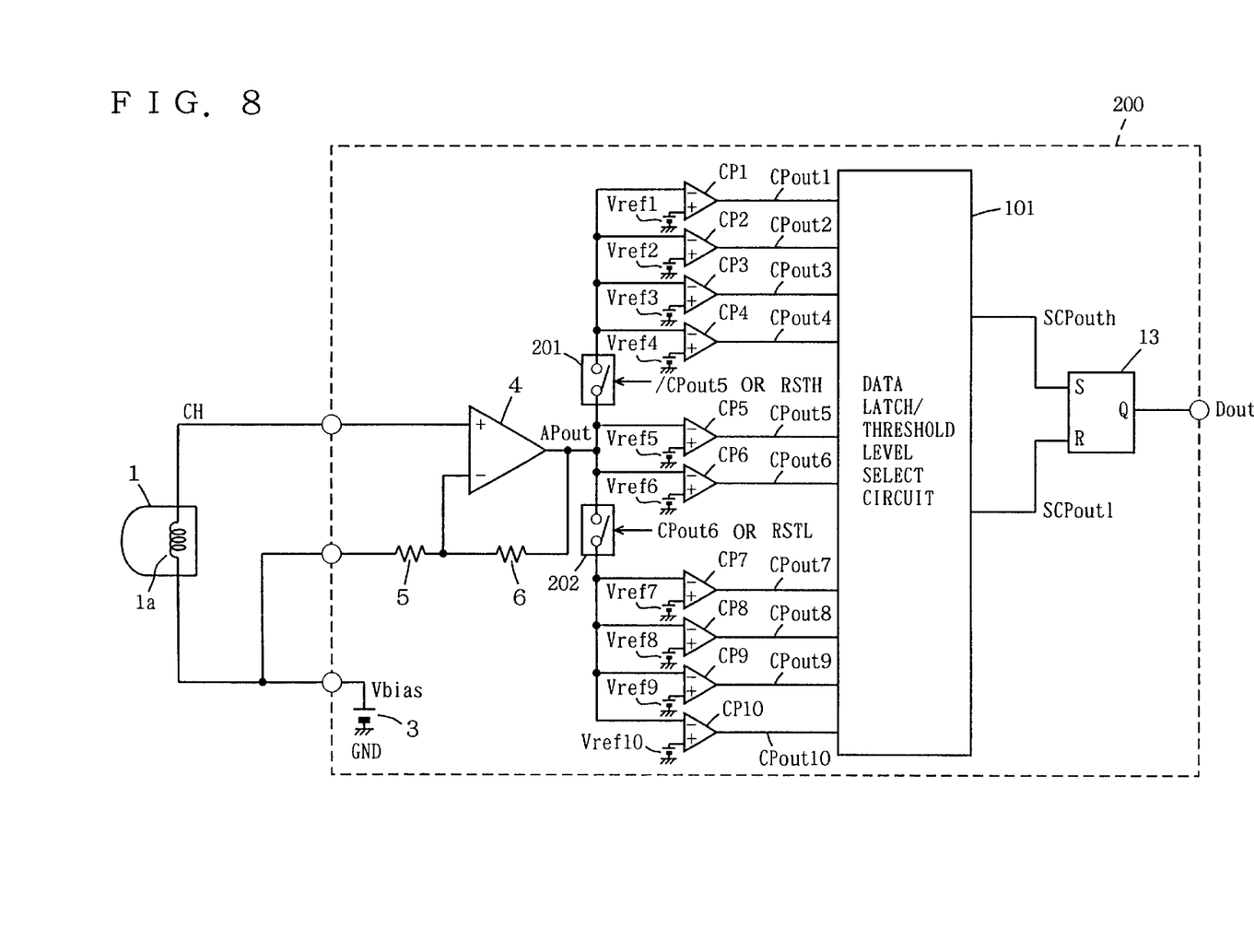
FIG. 8 is a block diagram showing a structure of a VISS signal detection circuit according to a second embodiment of the present invention.

FIG. 8 is a block diagram showing a structure of a VISS signal detection circuit 200 according to a second embodiment of the present invention. Referring to FIG. 8, VISS signal detection circuit 200 includes switching elements 201 and 202, in addition to the structure of the first embodiment shown in FIG. 2. Switching element 201 is connected between the inverting input terminal (−) of comparator CP5 receiving the lowest reference voltage Vref5 out of the five comparators CP1–CP5, and the inverting input terminal (−) of comparator CP4 receiving the second lowest reference voltage Vref4. Switching element 201 is turned on and off when output signal /CPout5 from inverter circuit 106 (FIG. 3) in data latch/threshold level select circuit 101 attains an H level and an L level, respectively. Switching element 202 is connected between the inverting input terminal (−) of comparator CP6 receiving the highest reference voltage Vref6 of comparators CP6–CP10, and the inverting input terminal (−) of comparator CP7 receiving the second highest reference voltage Vref7. Switching element 202 is turned on and off when output signal CPout6 from comparator CP6 attains an H level and an L level, respectively.

The operation of VISS signal detection circuit 200 of the above structure will be described hereinafter.

Switching element 201 is turned on only during the period when output signal /CPout5 is at an H level. Switching element 201 is off at other periods. Therefore, when the level of output signal APout from differential amplifier 4 does not arrive at the level of reference voltage Vref5, output signal APout is not applied to comparators CP1–CP4.

Switching element 202 is on only during the period when output signal CPout6 is at an H level. Switching element 206 is off at other periods. Therefore, when the level of output signal APout from differential amplifier 4 does not reach reference voltage Vref6, output signal APout is not applied to comparators CP7–CP10.

According to the second embodiment, output signal APout from differential amplifier 4 is applied to comparators CP1–CP4 and CP7–CP10 only when required. Therefore, the input capacitance can be suppressed even when there are many comparators.

As an alternative to output signal /CPout5, a reset signal RSTH from edge detection circuit 108 (FIG. 3) in data latch/threshold level select circuit 101 can be applied to switching element 201. Also, instead of output signal CPout6, reset signal RSTL from edge detection circuit 107 (FIG. 3) in data latch/threshold level select circuit 101 can be applied to switching element 202.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A VISS signal detection circuit detecting a VISS signal recorded on a magnetic recording medium, comprising:

a plurality of first comparators having threshold values differing from each other, each first comparator comparing a level of said VISS signal with its threshold value to supply an output signal when the level of said VISS signal is higher than that threshold value;

a plurality of second comparators having threshold values differing from each other, each second comparator comparing a level of said VISS signal with its threshold value to supply an output signal when the level of said VISS signal is lower than that threshold value;

a select circuit selecting an output signal from the first comparator having the second highest threshold value out of the first comparators supplying an output signal at a prior comparison, and an output signal from the second comparator having the second lowest threshold value out of the second comparators supplying an output signal at a prior comparison; and an output circuit providing a detection signal driven to a first level in response to one output signal from said select circuit, and driven to a second level in response to the other output signal from said select circuit.

2. The VISS signal detection circuit according to claim 1, further comprising an amplifier amplifying said VISS signal to be applied to said plurality of first and second comparators with a constant gain.

3. The VISS signal detection circuit according to claim 1, wherein said select means comprises a plurality of first latch circuits corresponding to said plurality of first comparators, each first latch circuit latching an output signal from a corresponding first comparator, a plurality of second latch circuits corresponding to said plurality of first latch circuits, each second latch circuit latching an output signal from a corresponding first latch circuit, a first logic circuit selecting the output signal from the first comparator having the second highest threshold value out of the first comparators supplying an output signal at said prior comparison in response to said plurality of second latch circuits, a plurality of third latch circuits corresponding to said plurality of second comparators, each third latch circuit latching an output signal from a corresponding second comparator, a plurality of fourth latch circuits corresponding to said plurality of third latch circuits, each fourth latch circuit latching an output signal from a corresponding third latch circuit, and a second logic circuit selecting the output signal from the second comparator having the second lowest threshold value out of the second comparators supplying an output signal at said prior comparison in response to said plurality of fourth latch circuits.

4. The VISS signal detection circuit according to claim 1, wherein said output circuit includes a flip-flop circuit set in response to said one output signal and reset in response to said other output signal.

5. The VISS signal detection circuit according to claim 1, further comprising:

a first switching element connected between an input terminal of the first comparator having the lowest threshold value out of said plurality of first comparators and an input terminal of the first comparator having the second lowest threshold value, and turned on in response to the output signal from the first comparator having said lowest threshold value; and a second switching element connected between an input terminal of the second comparator having the highest threshold value out of said plurality of second comparators and an input terminal of the second comparator having the second highest threshold value, and turned on in response to the output signal from the second comparator having the highest threshold value.

* * * * *